US008638640B2

(12) United States Patent
Brown et al.

(10) Patent No.: US 8,638,640 B2
(45) Date of Patent: Jan. 28, 2014

(54) ACOUSTIC TRANSDUCERS FOR UNDERWATER NAVIGATION AND COMMUNICATION

(76) Inventors: David Alan Brown, Barrington, RI (US); Boris Aronov, Needam, MA (US); Corey Lionel Bachand, New Bedford, MA (US)

( * ) Notice: Subject to any disclaimer, the term of this patent is extended or adjusted under 35 U.S.C. 154(b) by 0 days.

(21) Appl. No.: 13/236,321

(22) Filed: Sep. 19, 2011

(65) Prior Publication Data

US 2012/0236689 A1 Sep. 20, 2012

Related U.S. Application Data

(63) Continuation of application No. 12/616,254, filed on Nov. 11, 2009, now Pat. No. 8,027,224.

(51) Int. Cl.
*H04B 1/02* (2006.01)
*G01S 3/80* (2006.01)
*H04B 13/02* (2006.01)

(52) U.S. Cl.
USPC .......................................................... 367/119

(58) Field of Classification Search
USPC .......................................... 367/125, 124, 119
See application file for complete search history.

(56) References Cited

U.S. PATENT DOCUMENTS

| | | | | |
|---|---|---|---|---|
| 4,855,963 | A * | 8/1989 | Winbow et al. | 367/912 |
| 5,027,331 | A * | 6/1991 | Winbow et al. | 367/25 |
| 6,678,213 | B1 * | 1/2004 | Rask et al. | 367/163 |
| 6,768,702 | B2 | 7/2004 | Brown | |
| 7,406,001 | B1 | 7/2008 | Dzikowicz | |
| 8,027,224 | B2 * | 9/2011 | Brown | 367/153 |
| 2002/0159336 | A1 * | 10/2002 | Brown et al. | 367/138 |
| 2011/0110197 | A1 | 5/2011 | Brown | |
| 2012/0236689 | A1 * | 9/2012 | Brown et al. | 367/138 |

OTHER PUBLICATIONS

Brian T. Hefner and Benjamin R. Dzikowicz, "A spiral wave front beacon for underwater navigation: Basic concept and modeling," J. Acoust. Soc. Am. 129, 3630 (2011).

Boris Aronov, David A. Brown, Xiang Yan, and Corey L. Bachand, "Modal analysis of the electromechanical conversion in piezoelectric ceramic spherical shells," J. Acoust. Soc. Am. 130, 753 (2011).

Boris Aronov, Corey L. Bachand, and David A. Brown, "Analysis of the piezoelectric properties of tangentially polarized, stripe-electroded cylinders," J. Acoust. Soc. Am. 129, 2960 (2011).

Boris Aronov, Corey L. Bachand, David A. Brown, "Effects of coupled vibrations on the parameters of tangentially polarized stripe-electroded piezoelectric cylinders (L)" J. Acoust. Soc. Am. 129, 582 (2011).

Boris Aronov, "Coupled vibration analysis of the thin-walled cylindrical piezoelectric ceramic transducers," J Acoust. Soc. Am. 125, 803 (2009).

* cited by examiner

*Primary Examiner* — Daniel Pihulic

(57) ABSTRACT

Methods and transducers for producing acoustical signals having a spiral wavefront with omnidirectional magnitude and a phase that varies with angle and transducers for producing broadband omnidirectional reference signals for underwater navigation and communication.

33 Claims, 10 Drawing Sheets

ACOUSTIC TRANSDUCERS FOR UNDERWATER NAVIGATION AND COMMUNICATION

STATEMENT OF GOVERNMENT SUPPORT

This invention was made without government funding.

RELATED APPLICATION(S)

None.

FIELD OF THE INVENTION

The present invention relates to underwater acoustic transducers and in particular to acoustic sources producing spiral wavefront for underwater navigation to determine bearing angle and for communication.

BACKGROUND OF THE INVENTION

Underwater acoustic transducers are used in communications and to aid in determining the position and navigation of submerged objects. One such method to aid in navigation is to transmit a spiral wavefront consisting of a signal having a magnitude that is nominally constant but whose phase varies linearly as a function of azimuthal angle in a defined plane. Such a spiral wavefront signal can be compared with a reference signal of constant phase to determine the bearing angle. A beacon carrying such a transducer producing a spiral wavefront may be employed to transmit signals that can be detected by multiple objects or vehicles, thereby providing a cost effective navigation aid to determine bearing angle to the beacon. The challenge is to realize and effective transducer to accomplish this goal.

It is known to those skilled in the art, that one way to create a spiral wavefront is to employ a plurality of transducers arranged around in a cylindrical pattern around a rigid cylinder backing wherein each element is driven with an incremental phase bias that is retarded with respect a neighboring element in order to produce a spiral wavefront. It is also known to those skilled in the art, that a spiral wavefront transducer may be realized by employing a transducer or array of transducer elements arranged in a cylindrical-spiral pattern with each section or segment having an incremental radial offset with respect to its neighbor in order to create a spatial phase delay in the wavefront when driven by a common signal. This approach has a discontinuity when one full revolution is reached. These approaches are discussed in U.S. Pat. No. 7,406,001 by Dzikowicz and in the publication [Ref. Hefner and Dzikowicz J. Acoust. Soc. of Am.], in which a navigation method is proposed based on an underwater acoustic beacon comprising a transducer for producing a spiral wavefront signal and a transducer for producing a reference signal of constant phase aligned along a common central axis.

SUMMARY OF THE INVENTION

The subject invention relates to at least one electroacoustic transducer for producing a spiral wavefront having a phase that is a function of the azimuthal angle in the plane perpendicular to its axis of symmetry. In the preferred embodiment, the spiral wavefront transducer is comprised of at least one acoustic transducer that produces two spatially orthogonal acoustic dipoles each having a figure-of-eight directional response in a common plane that are electrically driven in phase quadrature, that is with a temporal phase bias of $\pi/2$ radians. Several variants are described that accomplish this objective.

In one embodiment, a spiral wavefront transducer is realized using a pair of electroacoustic transducers to form an acoustic dipole or doublet and a second pair of transducers to form a second acoustic dipole, where the main response axis of the first dipole element is arranged to be orthogonal to the main axis of the second dipole, and where each acoustic dipole is driven with a temporal phase bias of $\pi/2$ radians (90 degrees) or a suitable equivalent time delay. Methods of introducing the phase bias are well known to those skilled in the art. In this variant of the invention, the individual transducers may be comprised of cylinders, spheres, bars, or any suitable transduction element with any suitable transduction material.

In the preferred embodiment, the electroacoustic transducer is comprised of at least one hollow cylindrical piezoelectric transduction element for producing two orthogonal acoustic dipoles which are driven separately and phase biased in quadrature. Said elements are also known as piezoelectric cylinders, tubes, or rings. The at least one transducer can be comprised of piezoceramic elements that have inner and outer electrodes surfaces and may be radially polarized, or utilize narrow electrode stripes and be tangentially polarized on its inner and/or outer surfaces, or utilize a segmented cylinder comprised of piezoelectric wedges and/or bars with or without passive non-piezoelectric elements and glued to form a cylindrical piezoelectric element wherein said segmented cylindrical piezoelectric element is either circumferentially polarized or radially polarized. Further the transducer can be comprised of any suitable piezoceramic or piezocrystal material. Alternatively the transducer may be realized with any suitable magnetostrictive or electrostrictive material.

A single cylindrical transducer element may be utilized to produce both acoustics orthogonal dipoles and the reference signal. Alternatively a separate coaxially-aligned cylindrical element(s) may be used to produce either acoustic dipole or reference signal wherein the use of separate elements to produce the spiral wavefront and constant phase wavefront reference signal can have certain merits including the same resonance frequency and simplification in system design.

The spiral wavefront transducer can be realized by utilizing a radially polarized hollow piezoelectric cylinder having inner and outer electrodes, the electrodes on the inner and/or outer surface being divided in four nominally equal-sized parts, thereby presenting a means to excite opposite sections of the element with electrical signals, where said signals are phase biased in quadrature, that is they differ in phase by nominally $\pi/2$ radians or equivalently 90 degrees. Each opposing pair of electrodes is driven in anti-phase (opposite polarity) so as to create spatially orthogonal acoustic dipoles, that is acoustic radiation patterns having a spatial dependence that may be described as a figure-eight pattern and that are perpendicular to each other. The largest acoustic output will occur at a frequency of excitation coinciding with the resonance of the first mode of vibration of said cylindrical element although the radiation pattern remains sufficiently independent of frequency for a large range of frequency from below to above this resonance. Thus the spiral wavefront beacon will operate over a very broad frequency range. The resulting acoustical radiation achieved is characteristic of an ideal dipole and may be defined by the trigonometric functions cosine ($\theta$) and sine ($\theta$), that is they present a pair of figure-eight patterns that are spatially orthogonal in the plane perpendicular to the axis of symmetry. The superposition of the pair of spatially orthogonal dipoles that are in time-phase quadrature produce a spiral wavefront. The signals may originate from one electrical source and be phase biased by widely known methods to those skilled in the art, or from two separates sources that are phase biased in quadrature. Multiple cylindrical elements may be coaxially aligned to increase signal strength or used to extend the aperture (height) of the transducer to realize a narrower radiation beamwidth. It follows to those skilled in the art that side stripe-electroded cylinders that are tangentially polarized may be substituted for radially polarized elements, said elements having merits of higher effective electromechanical coupling. Similarly segmented piezoelectric cylinders comprised of bar-like wedges to achieve circumferential or radial polarization may be utilized. It also follows that separate cylindrical elements may be used for each acoustic dipole. It also follows that the division of electrodes may be designed to be nominally 180 degrees, 90 degrees, or 60 degrees or in general any angle less than 180 degrees. It also follows that the method described herewith may be extended to a spherical transduction elements or an open-spherical transduction element. It also follows that a spiral wavefront transducer may be realized with two or more acoustical dipoles with prescribed symmetric spatial and temporal phase bias. For example three dipoles each phase modulated by $\pi/3$ radians will produce a spiral wavefront.

In another embodiment, two omnidirectional reference sources are used, one positioned equally above and one below the source producing the spiral wavefront, to enable the estimation of the vertical bearing angle of an incoming signal by measuring the phase difference. Said two omnidirectional reference sources can also improve the horizontal bearing angle estimation as the summation of the pair will have an acoustic center collocated with the source producing the spiral wavefront. in this embodiment a preferred burst sequence of acoustic pulses would be: omni-reference 1, a time delay, omni-reference 2, a time delay, and spiral wavefront signal. The phase difference between omni-reference 1 and omni-reference 2 signals can be processed to yield a vertical (depression) angle. Further, for a spiral source positioned between the two omni-reference sources, the horizontal bearing estimation derived from phase measurements can take into account the phase due to the vertical offset from the horizontal plane to improve bearing angle estimation accuracy.

The hollow cylindrical transducers may be air-backed, fluid-filled, or polyurethane-filled to achieve different levels of depth survivability. Further, according to an embodiment of the present invention, the resulting transducer may also be encapsulated and have means for its connection through a suitable base structure for attachment to a suitable enclosure containing necessary electronics for processing signals to determine bearing angles.

According to an aspect of the present invention, a cylindrical transducer used in connection with the spiral wavefront transducer in either the omnidirectional reference transmit mode or bidirectional dipolar transmit mode may also be used as a receiver to detect signals or commands or bearing angle or range by time of flight or other methods known to those skilled in the state of the art.

According to another aspect of the present invention, radially polarized cylindrical piezoelectric elements having a height to diameter aspect ratio less than unity may be utilized to increase the effective electromechanical coupling coefficient and useable power factor bandwidth when producing circumferential vibrations. Alternatively radially polarized cylindrical piezoelectric elements having a height to diameter aspect ratio greater than about unity may be utilized to increase the effective electromechanical coupling coefficient and useable power factor bandwidth when vibrating at higher frequency upper-branches inducing axial and circumferential vibrations. In this variant, the omnidirectional reference signal can be produced at or near the vicinity of the frequency of the electromechanical resonance mode corresponding to the first axial resonance or "upper-branch" of the cylindrical transduction element and in a preferred embodiment the resonance frequency of this upper-branch mode is nominally the same as the frequency of the resonance of the acoustic dipole modes of the spiral wavefront on a separate transducer. This variant has the advantage that the frequency response, and in particular the phase response, will be more closely matched over a wider frequency range.

Another object of the preferred embodiment of the invention is to substantially mechanically isolate the ends of the hollow cylindrical piezoelectric elements from their cap and base, or from each other when multiple elements are utilized, while maintaining an air backed cavity in order to improve the vibration response of said cylindrical elements. In the preferred embodiment the transducer element is air backed, said elements having a base and a cap that are mechanically detached from the piezoelectric cylinder by means of a compliant spacer.

Still another aspect of the invention is realized by including an internal cylindrical supporting structure connecting the cap and the base of the transducer in order to increase the operational depth capabilities of the device and to reduce axial loading on the piezoelectric elements thereby maintaining the ability of the distal ends of the cylindrical elements to freely vibrate.

According to another aspect of the present invention, a method of electrical connection is included to allow individual elements or sections of electrodes of said cylindrical elements to be excited separately or simultaneously to produce desirable modes of vibration and corresponding acoustic radiation patterns.

According to another aspect of the present invention, individual elements may be selectively excited in the fundamental lowest order (zero) mode of extensional vibration and/or the next lowest order (first) mode of extensional vibration.

According to another aspect of the present invention, the spiral wavefront transducer may consist of thin walled hollow piezoelectric cylindrical or spherical elements, wired separately or together in parallel or in series, and encapsulated or molded or booted as a single structure and made electrically insulated from the fluid of immersion.

According to another aspect of the present invention, the spiral wavefront transducer may be attached to a mobile submersible vehicle, a platform, mooring, buoy, or floatation device.

According to another aspect of the present invention, the cylindrical transducer has an intermediate electrical mounting element to provide a means for joining the electrode of the piezoelectric elements) to the electrical wires carrying signals for excitation, wherein the electrical mounting element is mechanically isolated from the piezoelectric cylinders but within the transducer housing, encapsulation, molding or booting.

According to another aspect of the present invention, individual thin-walled hollow cylindrical piezoelectric elements may be made sufficiently thin such that the ratio of the thickness to radius is less than 0.15 to increase acoustic bandwidth while permitting useable operational depth in a submersed fluid.

According to another aspect of the present invention, the broadband transducer may be operated in transmit, receive or in duplex (both) modes of operation.

According to another aspect of the invention, the transducer is comprised of individual cylindrical elements that permit the interior of the hollow cylindrical transduction elements to be used for housing accompanying electrical elements such as but not limited to inductive tuning elements.

Further features, advantages and details of the present invention will be appreciated by those of ordinary skill in the art from a review of the figures and a careful reading of the detailed description of the preferred embodiments that follow, such description being merely illustrative of the present invention.

DETAILED DESCRIPTION OF EMBODIMENTS OF THE INVENTION

The present invention now will be described more fully hereinafter with reference to the accompanying drawings and mathematics to fully convey the scope of the invention to those skilled in the art.

Figure 1A:
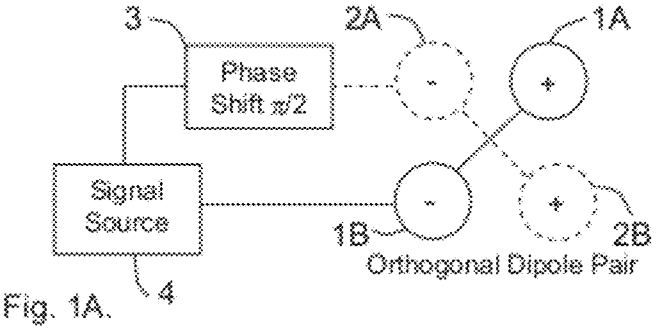
FIG. 1A is a schematic illustration of two spatially orthogonal acoustic dipoles driven by signals that have a relative phase bias of π/2 radians originating from one function generator.
Figure 1B:
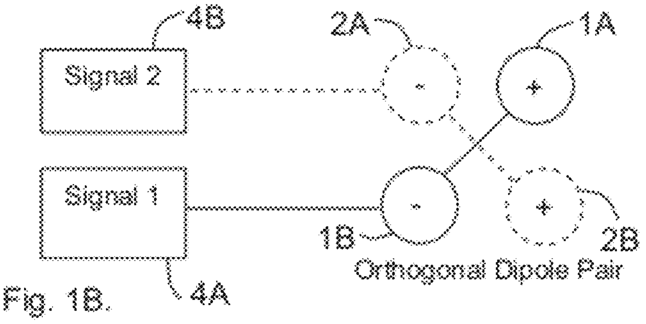
FIG. 1B is a schematic illustration of two spatially orthogonal acoustic dipoles driven by separate signals, the phase between the signal being nominally π/2 radians.
Figure 1C:
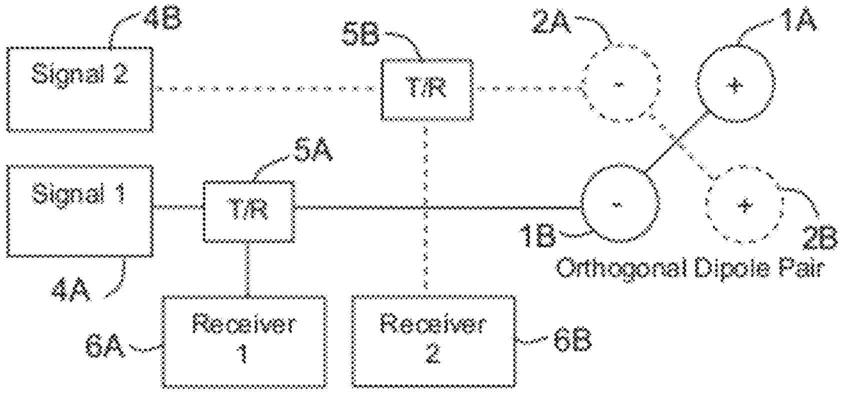
FIG. 1C. is a schematic illustration of two spatially orthogonal acoustic dipoles for transmitting and/or receiving signals, wherein transmit mode, each dipole is driven by separate signals, the phase between each signal being π/2 radians, and for receive mode the signals from each dipole are received separately and processed to determine angle of an incident wave.

FIG. 1 is a schematic illustration of two acoustic doublet or dipole transducers each consisting of two individual transducer elements. It is widely known to those skilled in the art that when the elements are spaced on the order or less than a half acoustic wavelength and the elements are driven 180 degrees out-of-phase (opposite polarity), the resulting radiation pattern or directional factor is cosinusoidal, $H(\theta)=\cos\theta$ where $\theta$ is measured with reference to a line intersecting the acoustic centers of each element. It is widely known that the transmit radiation pattern and receive radiation pattern are the same as guaranteed by reciprocity. Such a pattern itself is generally referred to as an acoustic dipole (pattern) or figure-eight. FIG. 1 also depicts a second pair of transducer elements that similarly produce an acoustic dipole pattern with its maximum response axis being orthogonal spatially offset by 90 degrees (π/2 radians). Keeping the same angle of reference, the directional factor of the second dipole can be described as sinusoidal; $H(\theta)=\sin\theta$. The figure further illustrates that the spatially orthogonal acoustic dipoles driven by synchronized signals that are phase biased in quadrature by $\pi/2$ radians.

Figure 2:
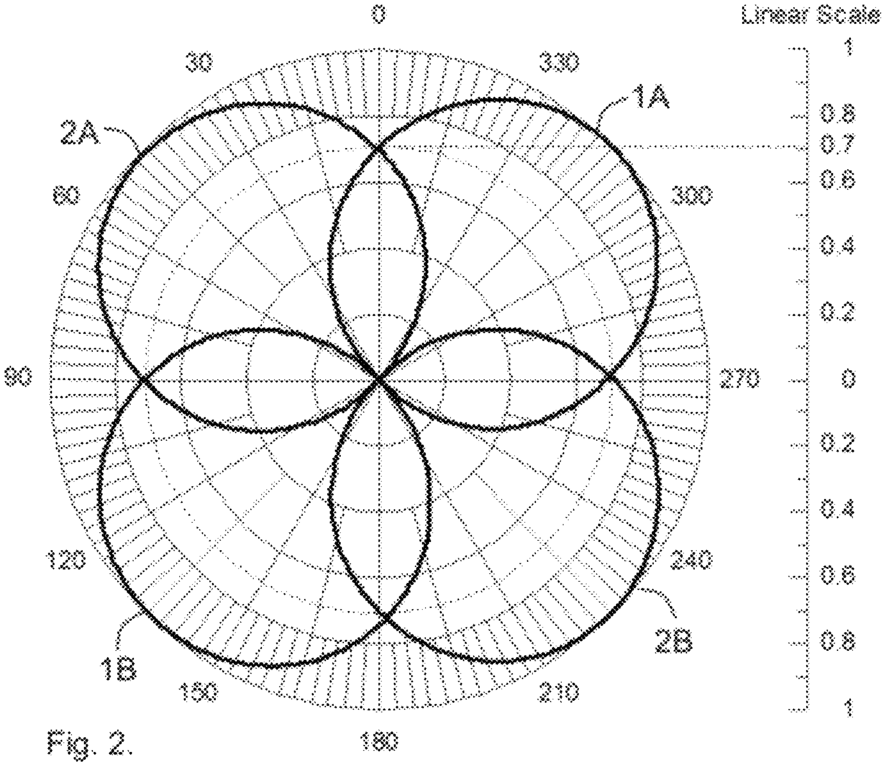
FIG. 2 is a measured directional factor of two orthogonal dipoles from the sine and cosine channels of a cylindrical transducer.

FIG. 2 shows an example of measured directional factors for two orthogonal dipoles from a cylindrical transducer for producing the spiral wavefront. In FIG. 2, lobes 1A and 1B are of opposite polarity and belong to one acoustic dipole and similarly lobes 2A and 2B are of opposite polarity and belong to a second acoustic dipole.

The proposed transducers for generating spiral wavefront transducer may be further understood with the aid of a little mathematics. Consider the acoustic field represented by two acoustic dipoles denoted as i=1,2 having pressure amplitude $P_i$, harmonic frequency $f_o$, field observation location defined by a radial distance r from the acoustic center of the source and an azimuthal angle θ defined relative to a reference angle, said angle residing in a plane perpendicular to the axis of symmetry of the transducer(s). Further consider that the response of one dipole is biased in temporal phase by φ radians, as may be synthesized electronically or introduced by a retarded time, where in the preferred embodiment consisting of two acoustic dipoles said phase is $\phi=\pi/2$ radians relative to the excitation frequency and resulting acoustic frequency as the transduction elements are linear in response. Thus the superposition of such signals in the submerged medium results in an acoustic signal described by $$p=P_1\cos\theta[e^{j2\pi ft}]+P_2\sin\theta[e^{j(2\pi ft+\phi)}] \quad (1)$$

where the use of complex notation has been adopted for the time dependence and under the conditions that the pressure amplitudes are equal $P_1=P_2=P=A/\sqrt{r}$, A being an arbitrary constant dependent on drive level and r being the range in the horizontal plane, the phase bias in quadrature $\phi=\pi/2$, and noting relations $j=\sqrt{-1}$ and $e^{j(\pi/2)}=j$, we arrive at $$p=Pe^{j2\pi ft}[\cos\theta+j\sin\theta]=Pe^{j2\pi ft}e^{j\theta}=Pe^{j(2\pi ft+\theta)}, \quad (2)$$

which is the expression of a traveling wave with a spiral wavefront having phase linearly dependant on azimuthal angle. Taking the real part we arrive at $$p=P\cos(2\pi ft+\theta) \quad (3)$$

Figure 3:
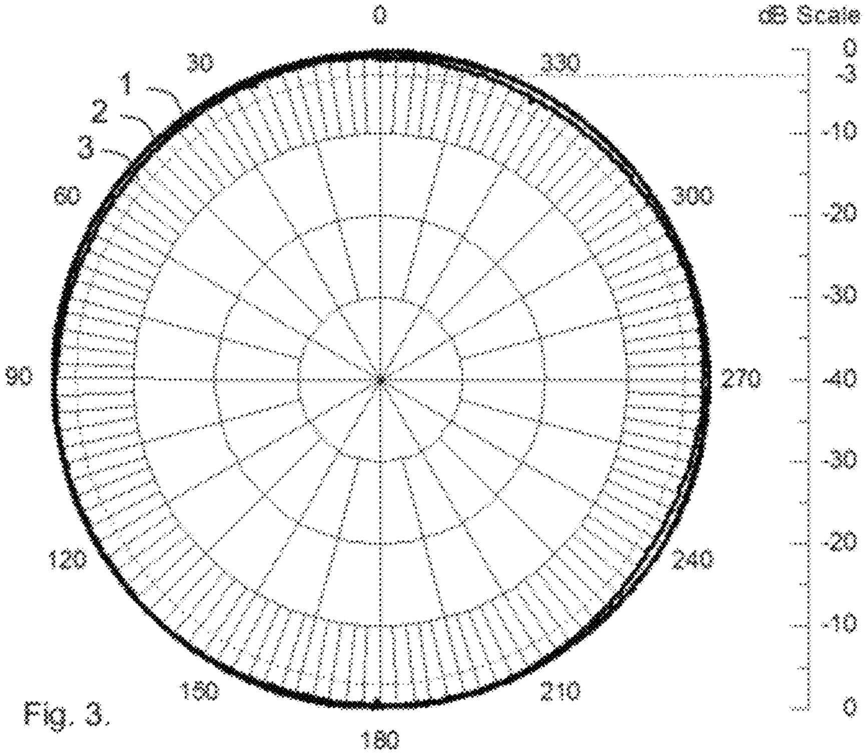
FIG. 3 is a measured directional pattern of the superposition of the two orthogonal dipoles excited with a relative quadrature π/2 phase shift from the sine and cosine channels of a cylindrical transducer that produces a spiral wavefront.

The magnitude of the spiral wavefront is independent of azimuthal angle as shown in FIG. 3 where the measured directional factor for the superposition of the two orthogonal dipoles excited with a relative quadrature $\pi/2$ phase shift from the sine and cosine channels of a cylindrical transducer is presented.

Figure 4:
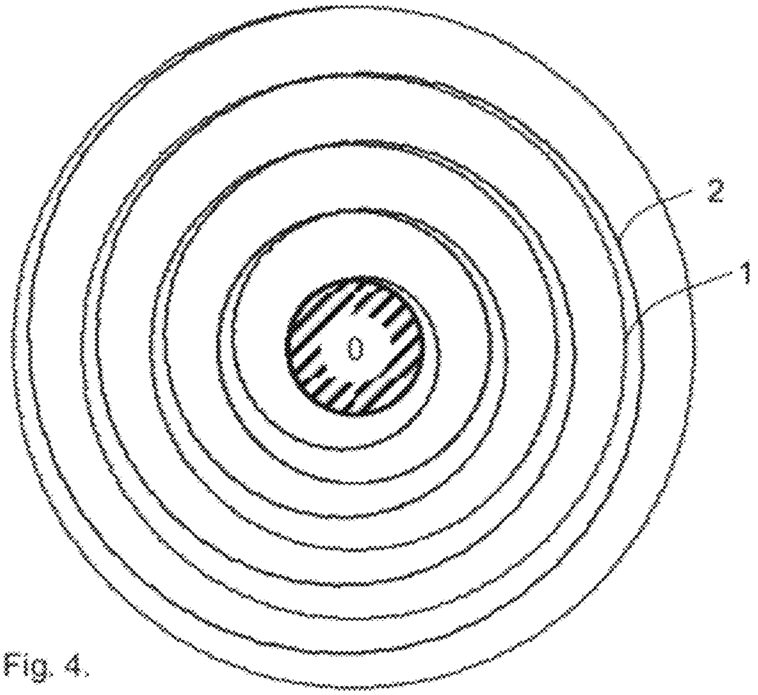
FIG. 4 is an illustration of the spiral wavefront and a constant phase wavefront (concentric circles) for reference.
Figure 8:
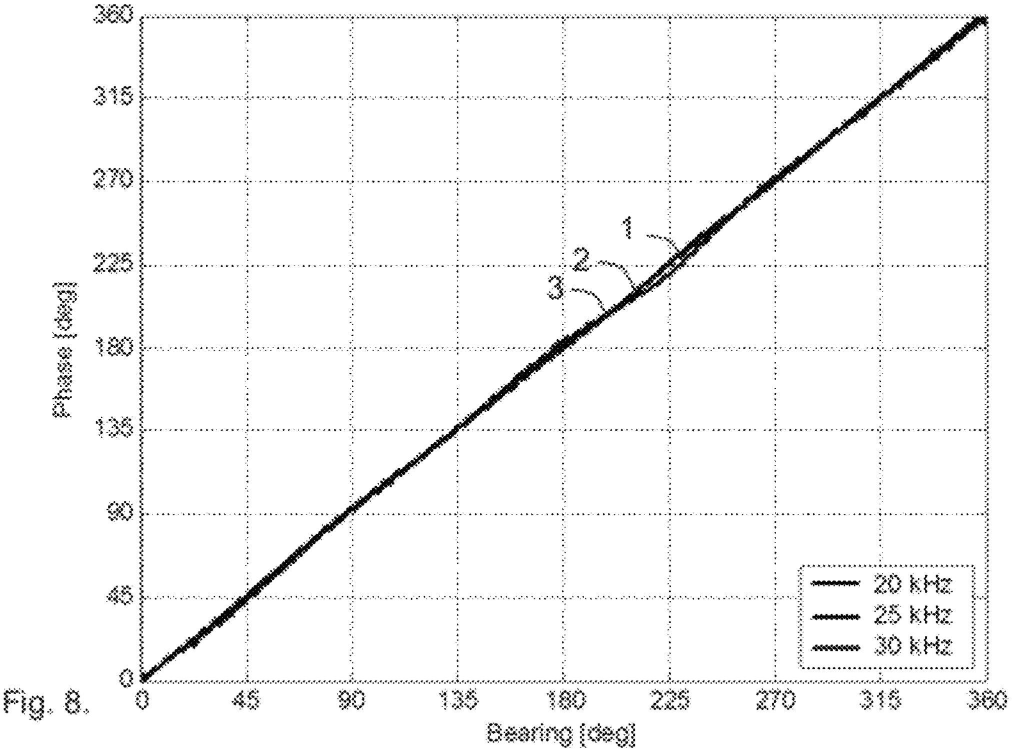
FIG. 8 is a plot of the measured phase angle of the spiral wavefront of the piezoelectric cylindrical transducer versus its azimuthal angle of rotation illustrating the expected linear relationship. Data at three measured frequencies is shown (corresponding to below, at, and above resonance of the first extensional mode of the cylindrical element).

An illustration of the spiral wavefront and constant phase wavefront reference ar shown in FIG. 4 by (2) and (1) respectively where (0) represents the cylindrical transducer. The phase angle of the spiral wavefront is a linear function equal to the bearing angle. The phase dependence of the spiral wavefront was measured versus bearing angle for a cylindrical transducer and is shown in FIG. 8.

Figure 5A:
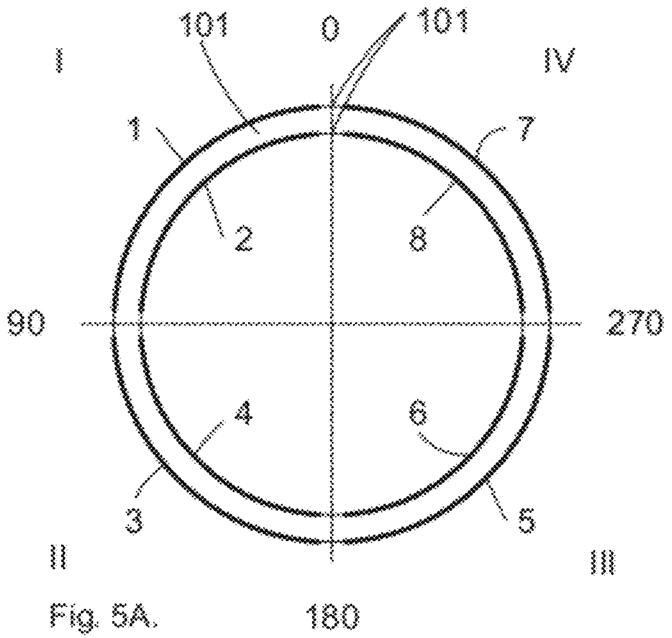
FIG. 5A is a top view of a schematic illustration of a preferred embodiment of the piezoelectric cylindrical transducer as a source of a spiral wavefront comprising a radially polarized cylindrical element indicating four quadrants with eight corresponding electrodes obtained by dividing the inner and outer electrode surfaces.

There are several variants of the present invention and the preferred embodiments are based on the use of hollow cylindrical piezoelectric elements. FIG. 1A shows an illustration (top view) of a preferred embodiment comprising a radially polarized cylindrical element having inner and outer electrodes. The electrode surfaces are further divided in four quadrants (I, II, III, IV) as indicated in the figure, producing eight corresponding electrodes, consisting of four internal electrode surfaces and four external electrode surfaces. In FIG. 5A, the piezoelectric cylinder is denoted by 100 and divisions of the electrode surfaces or gaps are denoted by 101 defining separate adjacent sectors. The separate electrode sectors may be realized in a radially polarized piezoelectric cylinder with inner and outer electrodes by removing a small strip of electrode by any suitable means thereby demarking four sectors which may in turn be individually addressed and similarly for the outer electrode surface. Alternatively the piezoelectric cylinders and electrode surfaces may be manufactured in the prescribed manner. The required separation of electrodes depends on the maximum voltage gradient to be applied on neighboring elements and typically is on the order of 1 to 2 millimeters. In the particular variant shown, one dipole is excited by connection of the electrode sectors labeled and with the following polarity (+3+8)−(4+7) and similarly an electrode connection according to (+1+6)−(2+5) will excite the orthogonal dipole. The signals energizing the two dipoles are phase biased by nominally $\pi/2$ radians relative to each other by a suitable means such a delay line or electronically controlled phase shift to realize the spiral wavefront transducer the details being known to those skilled in the art. It is understood by those skilled in the art that alternative combination of electrodes and/or polarization directions in the element can also produce acoustic dipoles.

There are several other variants of a single piezoelectric cylindrical element that will realize two spatial orthogonal dipoles and the resulting spiral wavefront transducer. Alternatively the outer electrode surface may be left undivided and connected as common (ground) and the two inner electrodes 8-4 and 2-6 may be used to excite corresponding dipoles. Still alternatively the inner electrode surface may be continuous or electrode parts may be connected in common and the corresponding opposite outer pairs of electrodes may be energized to excite orthogonal dipoles. Still another variant may be realized utilizing a radially polarized element having alternating quadrant polarization, for example where quadrant I and III are radially polarized in one direction (e.g. outward) and quadrants H and IV are radially polarized in the opposite direction (e.g. inward). In this variant a uniform radial electric field will induce acoustic dipoles.

Figure 5B:
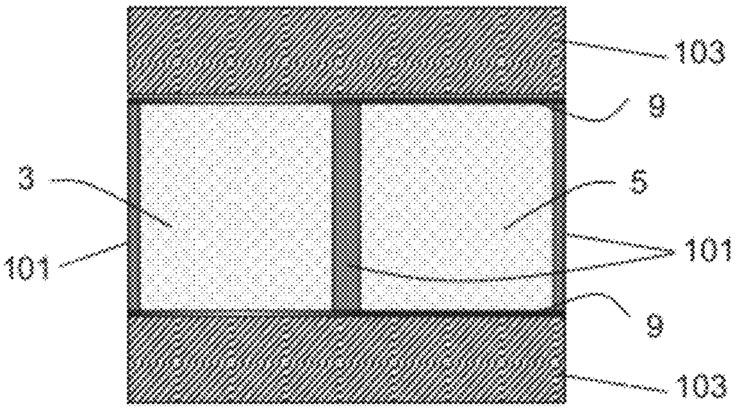
FIG. 5B is a side view illustration of a preferred embodiment of the piezoelectric cylindrical transducer as a source of a spiral wavefront comprising a radially polarized cylindrical element with outer electrode surfaces divided in four quadrants.
Figure 5C:
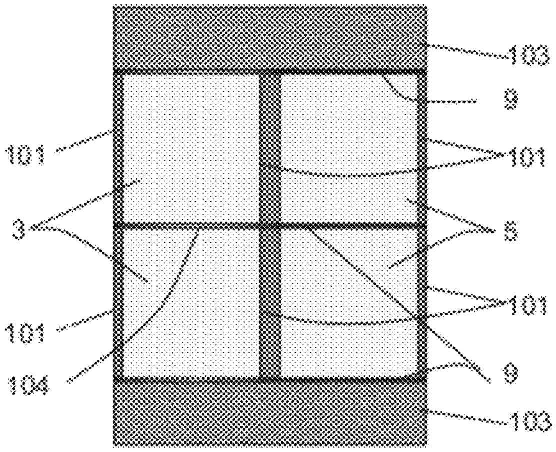
FIG. 5C is a side view illustration of a preferred embodiment of the piezoelectric cylindrical transducer as a source of a spiral wavefront comprising two coaxially aligned radially polarized cylindrical element with outer electrode surfaces divided in four quadrants.

In another variant one piezoelectric cylinder is used to create one acoustic dipole by suitable division of the electrodes in suitable sectors (180 degrees or less) and a second piezoelectric cylinder is used to create a second acoustic dipole with similarly divided electrodes. In yet another variant, multiple similar cylinders may be aligned axially and wired in parallel to increase signal levels and to narrow the vertical beamwidth of the resulting radiation. In still another variant one cylinder may have its electrodes span approximately 120 degrees of circumferential coverage with symmetric separations between electrodes of approximately 60 degrees, such a design having certain advantages in the effective electromechanical coupling and frequency response of the cylinders, resulting in broader acoustic bandwidth of the device. FIG. 5B further shows the elements 9 which function to mechanically isolate the vibration of the cylinders from its cap or base or from other coaxially aligned cylinders as in FIG. 5C.

Figure 5D:
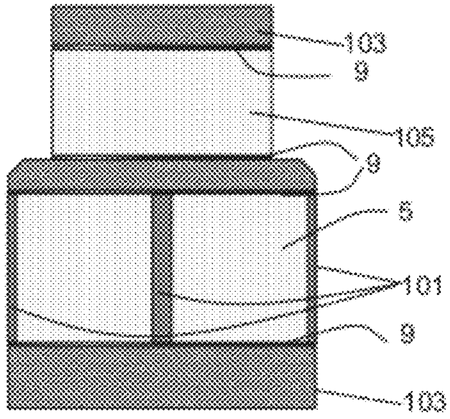
FIG. 5D is a side view illustration of a preferred embodiment of the piezoelectric cylindrical transducer as a source of a spiral wavefront comprising one radially polarized cylindrical element with outer electrode surfaces divided in four quadrants and a separate coaxially aligned transducer element for generating a constant phase reference signal.

FIG. 5D shows two cylindrical elements, one as in FIG. 5B having divided electrode surfaces for producing orthogonal acoustic dipoles and one smaller coaxial aligned cylinder for providing the constant phase reference signal. It is shown with a smaller diameter so that the resonance frequency of the transducer producing the constant phase reference signal (zero-mode) to be at the same frequency as that of the transducer producing the acoustical dipoles (first-mode). It is widely known to those skilled in the art that the resonance frequency of the dipolar (first-order) extensional mode of vibration of a hollow cylinder is a factor of $\sqrt{2}$ higher than the resonance frequency of constant phase (zero-order) extensional mode for the same element.

In another variant the piezoelectric cylinders are realized with tangentially polarized elements by using stripe-electrodes arranged vertically on the inner and outer surfaces of the piezoelectric element. A selective grouping of said electrodes can be made to excite sections of the piezoelectric cylinder in opposite polarity and consequently produce the acoustic dipole or dipoles. The benefit of using such a stripe-electroded tangentially polarized design is an increase in the effective electromechanical coupling factor and useable bandwidth over that of the radially polarized cylindrical piezoelectric element with the tradeoff of additional cost and increased electrode separation and hence higher voltage requirement.

In yet another variant the piezoelectric cylinders are realized with circumferentially polarized elements, which is typically accomplished by employing bar-wedge staves glued together circumferentially and electroded on their width or through the thickness to excite piezoelectric activity, and with the selective division of electrodes, said cylinder can be made to excite an acoustic dipole or pair of dipoles. The benefit of using such a segmented design is further increases in the effective electrical mechanical coupling factor and bandwidth.

Figure 6:
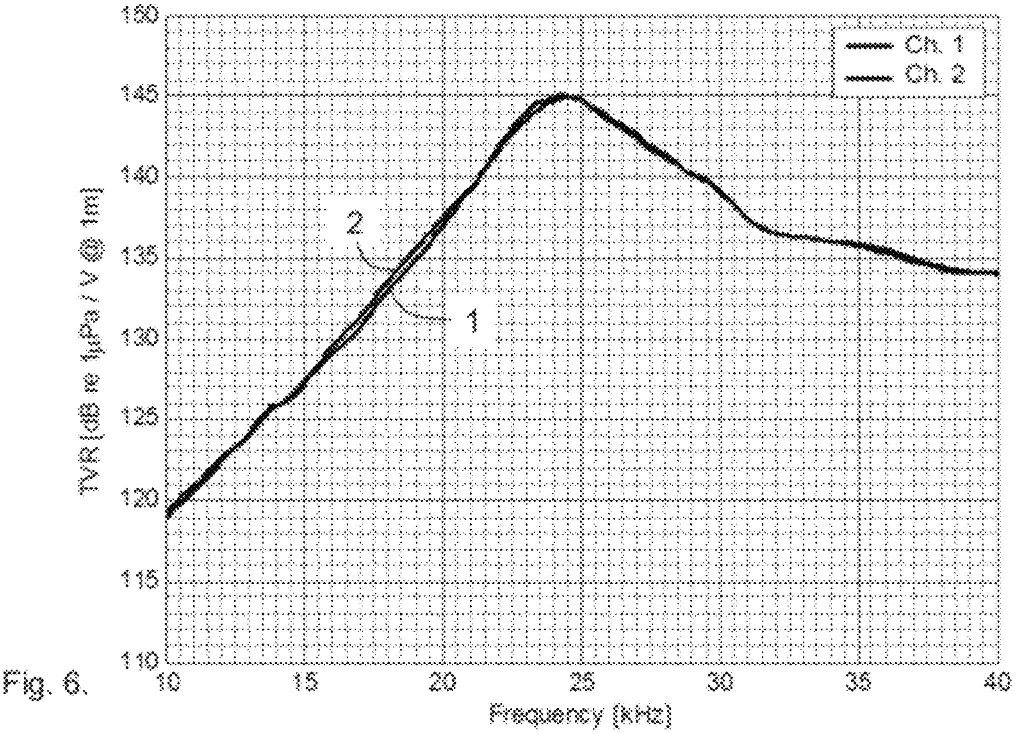
FIG. 6 shows a measured frequency response (Transmit pressure per unit voltage or TVR) of the two orthogonal dipoles (sine and cosine) channels of the piezoelectric cylindrical transducer as a source of a spiral wavefront.
Figure 7:
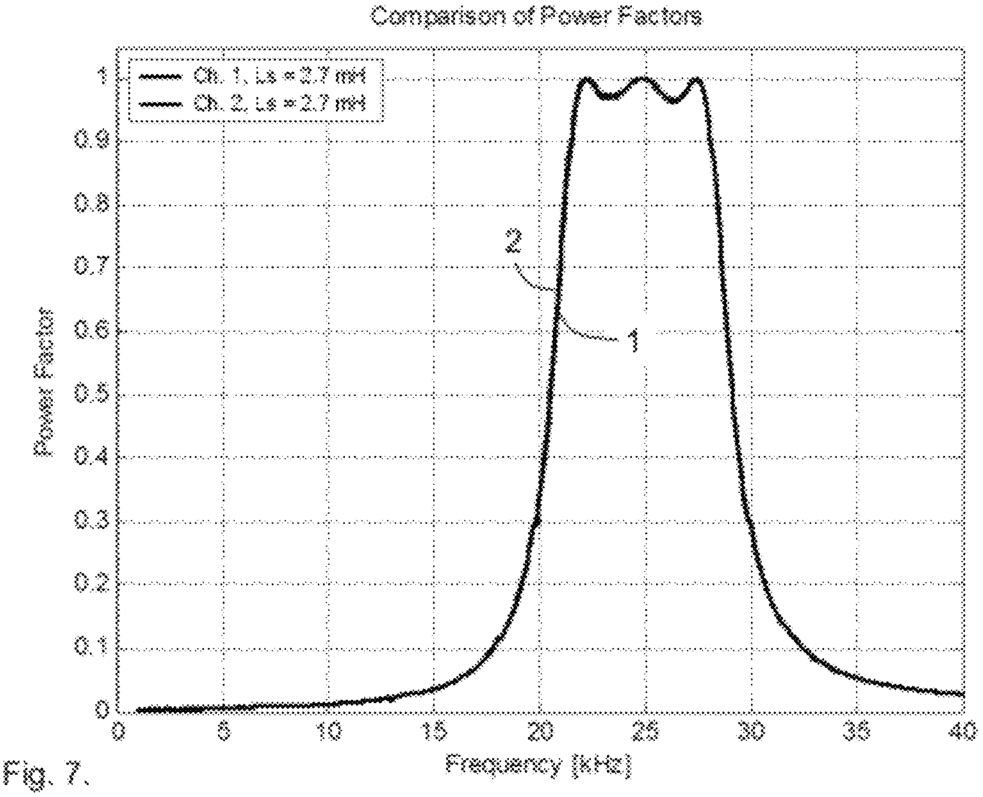
FIG. 7 shows a measured tuned power factor response of the sine and cosine channels of the piezoelectric cylindrical transducer as a source of a spiral wavefront.

An advantage of using cylindrical piezoelectric elements to create the acoustic dipoles includes the additional source level by operating at a natural resonance frequency of the transducer. To illustrate the benefits of operating at or near resonance in the preferred embodiment, the frequency response of a representative cylindrical transduction element is shown in FIG. 6 in the form of the acoustic pressure response per unit applied voltage as a function of frequency (or TVR-Transmit Voltage Response). The increase in response due to electromechanical resonance occurs for this particular variant at or near 25 KHz as illustrated in the Figure. Another advantage of using cylindrical piezoelectric elements near resonance to create the acoustic dipoles is the favorable impedance of the loaded transducer as can be characterized by the transducer's tuned power factor response. The measured tuned power factor response (cosine of the complex impedance phase angle) of each dipole channel of the radially polarized cylindrical transducer is depicted in FIG. 7. In this example a tuning inductance of 1.4 mH is used to cancel the capacitance reactance and extend the power factor above about 0.707 (−3 dB) over a frequency range of about 8 KHz or fractional bandwidth of about 30% for the radially polarized piezoelectric cylinder comprised. The transducer may be operated beyond this frequency range while preserving the figure-eight dipole response.

Another advantage of using cylindrical piezoelectric elements to create the orthogonal acoustic dipoles is that they are inherently aligned sharing the same acoustic center and axis of symmetry, and the radiation surface is inherently cylindrical free of any discontinuities and well suited for creating a cylindrical wavefront.

A prototype transducer was fabricated using a radially polarized piezoelectric cylinder with inner and outer electrodes divided in four quadrants and opposed pairs of electrodes connected to form orthogonal dipoles that were driven by two signals from two function generators that were maintained in phase quadrature according to FIG. 1B. The measured phase angle of the spiral wavefront versus the physical azimuthal angle referenced to the cylindrical transducer is illustrated in FIG. 8 showing the expected linear dependence. The measured directional pattern of the spiral wavefront of the same device is illustrated in FIG. 3. These results clearly demonstrate the feasibility of the proposed invention.

Figure 9A:
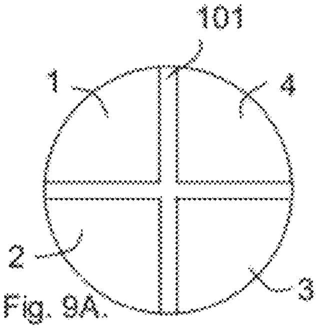
FIG. 9A shows a spherical piezoelectric shell transducer element having inner and/or outer electrode surface divided in four parts for producing two orthogonal acoustic dipoles which can be phase biased in quadrature for generating a spiral wavefront.

The illustration of FIG. 9A shows the top view of a hollow spherical piezoelectric shell transducer that is radially polarized having electrodes on its outer surfaces. The outer electrodes are divided in four separate sections to allow different parts of the piezoelectric element to be excited in opposite polarity to produce orthogonal acoustic dipoles in the fluid it is immersed said orthogonal dipoles being phase biased in quadrature to produce a spiral wavefront. The illustration shows the case of four outer electrodes labeled 1, 2, 3, 4 where it will become obvious to those skilled in the art that excitation of parts 1 and 3 in opposite polarity will produce an acoustic dipole and likewise excitation of parts 2 and 4 in opposite polarity will produce a second acoustic dipole with a maximum response that is orthogonal to the other dipole. In this variant there is one common inner electrode surface (not visible in the illustration). Alternatively, it follows that the inner electrode surface may be divided in four sections with the outer electrode made a common ground electrical connection, enabling the excitation of two orthogonal dipoles. Still alternatively both the inner and outer electrode surfaces may be divided in four parts to allow selective excitation of orthogonal acoustic dipoles in the same manner as has been detailed for the cylinder and illustrated in FIG. 5A. Further it follows that the inner and/or outer electrode surfaces can each be divided in eight symmetric parts, four electrode quadrants in one hemisphere and four in the opposing hemisphere, wherein three orthogonal acoustic dipoles can be excited any two of which may be phase biased by $\pi/2$ radians to create an acoustic spiral wavefront. Further, if follows that the electrode surfaces may be switched and connected to selectively excite a monopole (omnidirectional response), a dipole (figure-eight response), or two orthogonal dipoles in transmit mode or received mode with or without a quadrature phase bias between orthogonal dipoles. Further, it follows the electrode surfaces may be connected to form hemispherical surfaces which may be switched to selectively form combinations of monopole and dipole radiation patterns, most notably a cardioid response defined by $1+\cos\theta$.

Figure 9B:
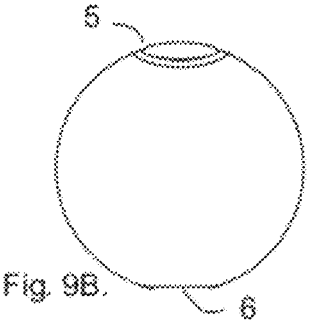
FIG. 9B shows a hollow spherical piezoelectric shell transducer element with coaxially aligned holes on each pole for producing an acoustic signal with constant phase wavefront and broad vertical beamwidth.

The FIG. 9B illustrates a hollow spherical piezoelectric shell transducer with one hole on one pole (5) and a second hole on the opposite pole (6) for producing an omnidirectional signal in the one (horizontal) plane perpendicular to said axis of symmetry having a nominally broad beam width in the orthogonal (vertical) plane due to the curvature of its surface. Such a transducer has attributes of a lower resonance frequency than a complete sphere of the same diameter and higher frequency than a cylinder of same diameter.

Figure 9C:
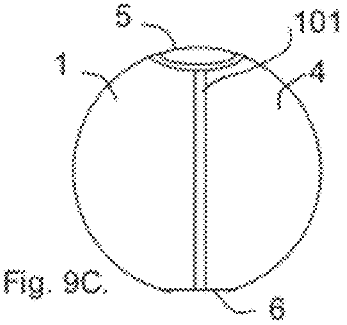
FIG. 9C shows a hollow spherical piezoelectric shell transducer element with axisymmetric aligned holes on each pole with inner and/or outer electrode surfaces divided into four parts to produce orthogonal acoustic dipoles which are phase biased in quadrature to produce a spiral wavefront.

FIG. 9C shows a hollow spherical piezoelectric shell element with axisymmetric aligned holes (5, 6) on each pole with a division of its outer electrode surfaces into four parts. Excitation of opposing electrode surfaces in opposite polarity produce orthogonal acoustic dipoles which in turn may be phase biased in quadrature to produce a spiral wavefront signal. It follows that the inner electrode surfaces may be divided in four parts and the outer surface left as a common ground, or alternatively both the inner and outer electrode surfaces may be divided in four parts and opposing pairs of electrodes connected in opposing polarity to excite two orthogonal dipoles. Further both inner and outer electrodes may be divided at least four sections permitting the excitation of acoustic dipoles, Further, if follows that the electrode surfaces may be switched and connected to selectively excite a monopole (omnidirectional response), a dipole (figure-eight response), or two orthogonal dipoles in transmit mode or received mode with or without a quadrature phase bias between orthogonal dipoles. Further, it follows the electrode surfaces may be connected to form hemispherical surfaces which may be switched to selectively form combinations of monopole and dipole radiation patterns, most notably a cardioid response defined by 1+cos θ.

The method of excitation of a spiral wavefront using orthogonal quadrature phase biased dipoles generated from a cylindrical piezoelectric transducer enables an improved underwater acoustic communications transducer with greater bandwidth. It is widely known that a cylindrical transducer can be excited in multiple modes of vibration with the excitation of the lowest zero-order resonant mode of extensional vibration being the most common. The cylindrical transducer is most widely used in transmit mode at frequencies in the vicinity of this extensional resonance. The useable bandwidth may be further extended by excitation of orthogonal and quadrature phase biased acoustic dipole modes to create a spiral wavefront arising from the superposition of extensional resonances corresponding to the first-mode of vibration. Whereas the excitation of one dipole produces a bidirectional 'figure-eight" response, the excitation of two orthogonal dipoles with the quadrature phase bias produces an omnidirectional response in magnitude thereby substantially increasing the useable acoustic bandwidth of the device as two resonant modes are exploited. The bandwidth of the transducer can be further increased by operation at or in the vicinity of a third electromechanical resonance mode corresponding to the first axial resonance "upper-branch" of the cylindrical transduction element, the dependence of the resonance frequency on height-to-diameter aspect ratio known to those skilled in the art and for the limiting case of a very short cylinder (or ring) occurs at a nominal frequency equal to the ratio of the speed of sound of the piezoelectric material to twice the cylinder height. The calculation of the actual resonance frequency is beyond the scope of this specification but also known to those skilled in the art. Under the conditions that the distal ends of cylindrical piezoelectric elements of finite height remain relatively free to vibrate, said axial vibrations are transformed into radial vibrations which in turn produce an effective omnidirectional radiation in the plane orthogonal to the axis of symmetry of the cylinder. Under these conditions is advantageous to utilize a cylinder having a height-to-diameter aspect ratio larger than about ½ so that the resonances of the extensional zero-order mode, dipole mode, and axial upper-branch modes are sufficiently spaced so as to exploit greater coverage in frequency. Thus the excitation of the three modes of vibration enables a triply resonant cylindrical transducer with omnidirectional radiation characteristics in at least one plane.

Figure 10A:
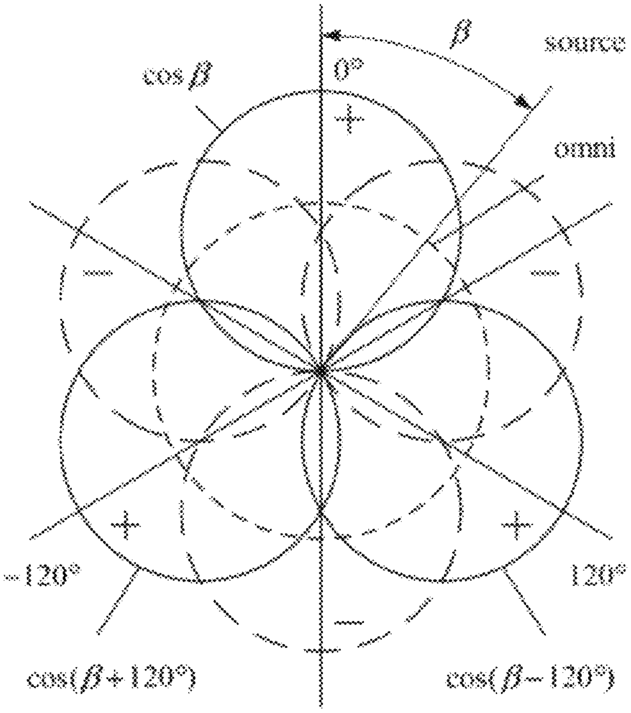
FIG. 10A shows the directional factor of three acoustic dipoles symmetrically arranged 120 degrees apart in one plane.

A spiral wavefront can be generated by a transducer using more than two symmetrically spaced and phase biased dipoles. For example, an underwater acoustic beacon for generating a acoustic signal having a spiral acoustic wavefront can be realized with at least one electroacoustic transducer to create three spatially equally spaced acoustic dipoles producing characteristic figure-eight radiation response with angle each spaced symmetrically 120 degrees apart as illustrated in FIG. 10, wherein each dipole is energized by one of three signal sources supplying electrical signals that are temporally phase biased by either $2\pi/3$ or $\pi/3$ radians (120 or 60 degrees out-of-phase), wherein their linear combination produces a spiral acoustic wavefront. Such a transducer can also have desirable traits when used in receive mode.

Figure 10B:
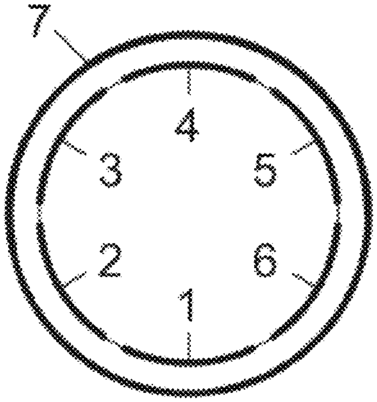
FIG. 10B shows a cylindrical piezoelectric transducer element in cross-section with inner electrodes divided in six parts defining six sectors and outer electrode as a common ground. Connection of electrodes pairs 1 and 4, 2 and 5, and 3 and 6 in anti-phase produce trigonal dipoles and when symmetrically phase biased produce a spiral wavefront.

One variant of the proposed transducer is realized using a cylindrical piezoelectric element as in FIG. 1 but with inner and/or outer electrodes surfaces divided in six parts each spanning nominally a 60 degree sector wherein various operational modes are possible as illustrated in FIG. 10B. Connection of three pairs of opposing electrodes will realized three symmetrically spaced acoustic dipoles for operation in transmit or receive mode. In transmit mode each dipole is excited by separate signals each having a relative phase difference of $\pi/3$ radians. Further single 60 degree sectors or neighboring sectors spanning 120 degrees, or 180 degrees may be energized to realize a unidirectional radiation pattern where the excitation of only parts of the cylindrical surface result in a multimode excitation of the element. In receive mode the output of each dipole is measured and using trigonometric relations known to those skilled in the art, the bearing angle of an incoming signal may be determined unambiguously.

Similarly, another variant of the underwater electroacoustic transducer may be realized by utilizing at least one hollow cylindrical piezoelectric element with inner and/or outer electrode surfaces divided in at least three parts, thereby defining N sectors, each sector having electrical connections of opposite polarity for the transmission or reception of sound, where the transducer is enabled by the addition of a switch for the selective excitation or reception of any one or more combinations of adjacent or opposing sectors. In one embodiment of the transducer, the phase of signals from neighboring sectors pr combinations of sectors of the cylindrical piezoelectric element may be measured to determine the direction of an incoming sound signal. The angle of incidence may be determined by methods known to those skilled in the art as is done with pairs of hydrophones used in ultra-short baseline methods. The advantage in the present invention is that one cylindrical transducer with divided electrodes can replace multiple hydrophone units while still having its additional functionality.

It is apparent to those skilled in the art that an acoustic dipole may be realized using an acoustic doublet wherein two small omnidirectional sources are separated by less than a half wavelength and excited in anti-phase, that is 180 degrees out-of-phase. The new invention proposed the addition of a second dipole spatially orthogonal that is further phase biased by $\pi/2$ radians together with the first dipole to produce the spiral wavefront. Thus it follows that a compact array of four small (where small means smaller than the acoustic wavelength) acoustic sources that are each phase biased by 90 degrees relative to its nearest neighbor is identical to a pair of orthogonal acoustic doublets that are phase biased in quadrature. In this variant there is no centrally located cylindrical rigid body or backing material behind the transducers and the transducer elements are assumed to be small enough that diffraction effects are negligible. Also it is noted that a 180 degree phase bias is realized simply by reversing the polarity of the excitation signal by reversing the wiring polarity.

Figure 11:
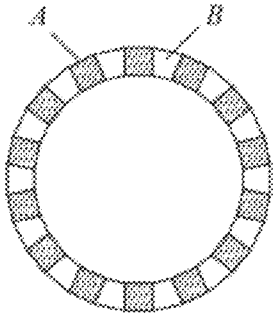
FIG. 11 shows an illustration of a segmented cylinder transducer comprised of active piezoelectric bar elements (A) and passive wedge elements (B).
Figure 11A:
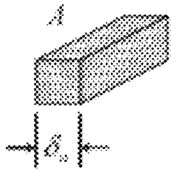
FIG. 11A further shows active piezoelectric bar elements with rectangular cross section.
Figure 11B:
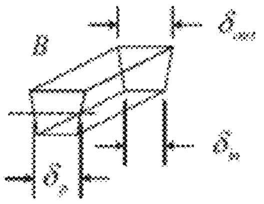
FIG. 11B further shows passive wedge elements.
Figure 12A:
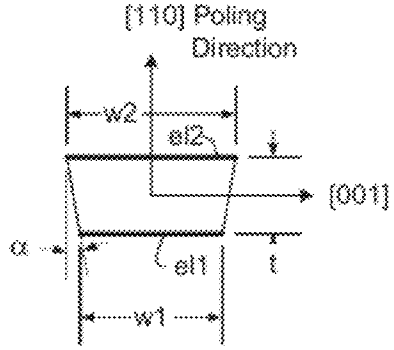
FIG. 12A shows an illustration (Top view) of a piezoelectric crystal wedge transversely polarized in the [110] orientation to achieve maximum transverse strain in the orthogonal direction to the polarization i.e. in the direction of width.
Figure 12B:
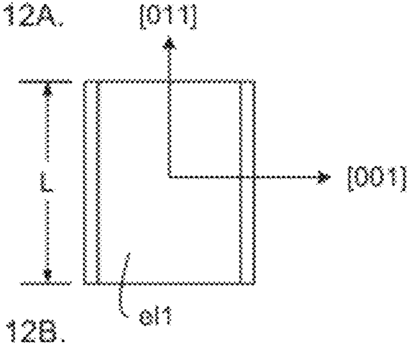
FIG. 12B shows an illustration (side view) of the piezoelectric crystal wedge transversely polarized in the [110] orientation.

The advent of piezoelectric relaxor single crystal materials (piezocrystals for brevity) with high electromechanical coupling, high compliance and low sound speed, and high piezoelectric d-constants offers additional utility to the proposed navigation and communication transducers and methods as well as for cylindrical transducer variants for other purposes. A hollow cylindrical piezoelectric transducer can be realized with single crystal materials by cementing, gluing, or epoxying bar or wedge prisms in a cylindrical pattern wherein individual or combinations of piezocrystals can be transverse (through thickness) or longitudinal (through width) polarized, or alternatively stripe-electroded and tangentially polarized. Further the segmented cylinder or ring can include both active piezoelectric elements and passive prismatic bars or wedges, the combination affording the opportunity to tailor the diameter and resonance frequency of the cylinder and offering certain advantages by increasing the radiation loading from increasing its size. In the preferred embodiment, the passive elements are the same nominal thickness but stiffer being made from a material having a significantly higher elastic modulus. The effect on the electromechanical induced vibrations and piezoelectric energy conversion of the segmented cylinder are minimized when utilizing passive elements that are stiffer than the active piezocrystal elements. Utilizing stiffer passive elements reduces the lowering of the effective electromechanical coupling coefficient, the piezoelectric modulus or d-constant (d33 or d31), and the effective compliance of the cylinder. Utilizing stiffer passive elements increases the axial resonance frequency therein reducing deleterious effects of coupled electromechanical vibrations. For the axial vibration of mechanical elements in parallel, the stiffness of the (passive) element is dominant. For lateral vibration of mechanical elements in series, such as for circumferential deformations in the segmented cylinder, the compliance of the (active) element is dominant. Still further the segmented cylinder or ring can be comprised of active piezoelectric elements in the shape of prismatic bars with uniform rectangular cross-section having either transverse or longitudinal polarization through the width or thickness where said prismatic bars have a polarization that is oriented in prescribed relation to the crystallographic axis of the piezocrystal elements. Further, the segmented ring may have the combination of active piezoelectric bar prisms of rectangular cross-section glued to passive prisms of trapezoidal cross-section as illustrated in FIGS. 11, 11A and 11B, thereby offering certain advantages in reducing manufacturing costs, allowing standard active elements to be utilized for multiple designs. Alternatively wedges or curved wedges may be substituted for passive prisms of trapezoidal cross-section. Further it is proposed that advantages in performance and/or ease in manufacturing may be achieved by utilizing the transverse polarization of the bar or wedge prism (with rectangular or trapezoidal cross-section) of piezocrystal material with a prescribed crystallographic diagonal orientation and polarization direction as denoted by Miller Indices <110> further illustrated in FIGS. 12A and 12B, said notation being evident to those skilled in the art and further illustrated in FIG. 13B. In FIG. 12A, electrodes on the inside (el1) and outside (el2) surfaces are attached to the piezocrystal, wherein the direction of polarization and electrical field is through the thickness (t) of the element defined by the separation of said electrodes. The crystal is diagonally cut so that the [110] orientation is in the direction of the thickness defined by a vector normal to either electrode surface. For the wedge segment show the mean width of the element is (w1+w2)/2 where w1 is the width of the inner surface and w2 is width of the outer surface; wherein the wedge is cut at an angle $\alpha$. It is obvious that the thickness (t), length (l), mean width and cut angle will define the dimensions of the assembled segmented cylinder.

Figure 13A:
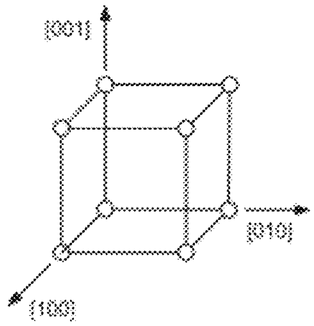
FIG. 13A shows an illustration of crystal orientation using the Miller Index formulation for the type <100> orientated direction.
Figure 13B:
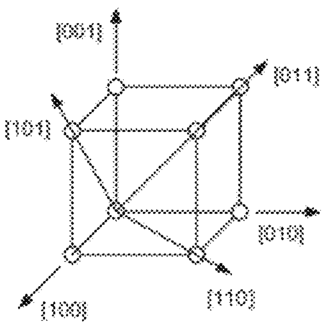
FIG. 13B shows an illustration of crystal orientation for the type <110> orientated direction.

Lattice planes and directions are typically described by using a Miller Index to specify specific planes, orientation and polarization of a crystal. In the cubic lattice system, the [jkl] direction defines a unit vector normal to surface of a particular plane or facet as indicated in the FIGS. 13A and 13B. Thus orientation type <100> has equivalent directions: [100],[010],[001], Orientation type <110> across the diagonal has several equivalent directions: [110], [011], [101],[-1-10], [0-1-1], [−10-1], [−110], [0-11], [−101],[1-10], [01-1], [10-1]. The type <100> and <110> directions are illustrated in FIGS. 13A and 13B. Polarization of piezoelectric relaxor single crystal bar or wedge elements through the thickness in this diagonal direction <110> for produces a high transverse d31 (or d32 depending on notation) piezoelectric modulus in the transverse orthogonal (width) direction and an accompanying high transverse k31 (or k32 depending on notation) electromechanical coupling compared to transverse polarization in the [001] direction. Thus we seek to exploit the <110> polarization direction for transverse excitation of a segmented cylinder or ring comprised of bar or wedge elements.

The segmented cylinder or ring may be comprised of piezocrystal prisms of rectangular bar or wedge cross-section arranged for transverse piezoelectric excitation of extensional circumferential vibration of the cylinder in the so called 31-mode of operation where 3 indicates the direction of polarization as radial direction (r) and 1 indicates the direction of strain as circumferential ($\theta$) wherein the piezocrystal prisms have a crystallographic symmetry described by [110] or its equivalents [011, etc.] in relation to the polarization. This combination produces a maximum strain in the circumferential direction of the cylinder comprised of said bars or wedges due to its excitation by the transverse piezoelectric effect when utilizing the [011] crystal symmetry and polarization direction. The descriptions of [011] crystal symmetry is well known to crystallographers and those skilled in the art. The description of transverse polarization induced vibration denoted by (31) mode is well known to those skilled in the art of transducers. An ambiguity exists in that the prescribed transverse polarization induced strain may also be denoted as (32) mode for a long thin rectangular bar and such notation may be adopted as well, but we will use the (31) notation as is conventional and commonly used for cylindrical transducers, the bars being an intermediate step for their realization.

It follows that the segmented cylinder comprised of transversely polarized (31) mode piezocrystal prismatic bar or wedge elements having [011] crystal symmetry will be arranged so that the piezocrystal elements are electroded and accessible on the inner and outer surfaces of the segmented cylinder, and further said segmented cylinder may be comprised of the active piezoelectric elements or both active (piezoelectric) and passive (non-piezoelectric) elements, wherein the combination of both active and passive elements both may have wedge prisms with trapezoidal cross-sections, or alternatively either the active or passive elements only may have wedge prisms with trapezoidal cross-sections.

It follows that the segmented cylinder may be comprised of longitudinally polarized (33) mode piezocrystal prismatic bars or wedge elements having [100] crystal symmetry or their equivalent with or without inter-dispersed passive bar or wedge elements arranged so that the piezocrystal elements are electroded on surfaces within the segmented cylinder located between neighboring elements. Further said segmented cylinder may be composed of both active (piezoelectric) and passive (non-piezoelectric) elements, wherein the active elements have rectangular cross-section and the passive elements have trapezoidal cross-sections and electrodes are attached by a suitable means as known to those skilled in the art.

Further it follows that the electrodes of the segmented cylinder comprised of transversely or longitudinally polarized piezocrystal elements with polarization in either the [110] or [100] crystal directions may be divided and grouped and energized to excite different modes of extensional vibrations including but not limited to the lowest zero-mode having uniform displacement, the first-mode having displacement described by $\cos(\theta)$ which produces an acoustic dipole, their combination $1+\cos(\theta)$ which produces a cardioid pattern, orthogonal first-mode dipoles $\cos(\theta)$ and $\sin(\theta)$, orthogonal and quadrature phase biased orthogonal modes and their combination producing the spiral wavefront, and higher nth-order modes, several combinations of which may be excited by energizing a part of the segmented cylinder. It follows that the segmented single crystal cylinder transducer may be used in transmit or receive mode.

Further the segmented cylinder comprised of transversely or longitudinally polarized piezocrystal elements to realize a cylindrical transducer may have a part of its outside or inside surface acoustically shielded or baffled to prevent acoustic radiation or reception of sound or to induce unidirectional radiation patterns. The cylindrical conformal acoustic baffle may be comprised of a tube-like structure having an inner and outer diameter elastic structure that may be fitted or pressed over the cylindrical transducer surface, thereby permitting only part of the cylindrical transducer to be exposed to a fluid medium.

Further it follows that the segmented piezocrystal hollow cylinder may be comprised of both piezocrystal active bars or wedges and piezoceramic active bars or wedges, wherein the piezoceramic elements may be substituted for the passive elements in the previously described designs wherein it is noted that the modulus of elasticity of piezoceramic elements is much higher (often by a factor of 2 to 3 times) than piezocrystal materials such as that known as PMN-PT and PIN-PT compositions to those skilled in the art.

Further it follows that a hollow spherical shell transducer or hollow spherical shell with open holes at each polar location may be realized by employing a mosaic of piezocrystal plates polarized through their thickness in either the [100] or [110] crystal orientations or their equivalents so as to excite the shell by transverse planar piezoelectric effect. Further it follows that said piezocrystal plates may be of triangular, rectangular, trapezoidal or combinations of such shapes. Further it follows that the spherical elements will have internal and external surface electrodes and that comprising mosaic elements will be connected electrically. Still further it follows that said electrode elements may be divided in sectors, such as in hemispheres, or quadrants, octants, sectants, or at prescribed longitudinal parallels, thereby permitting the means for excitation of extensional modes of vibration of nth order or their combinations. Further it follows that the single crystal hollow spherical element may have a part of its outside or inside surface acoustically shielded or baffled to prevent acoustic radiation or reception of sound at that location or to induce unidirectional radiation patterns.

In yet another variant, it follows that a compliant conformal acoustic baffle having a tube-like structure comprised of a compliant acoustic baffle may be fitted around a cylindrical acoustic transducer to permit directional radiation or reception of sound, wherein said baffle causes a reduction of the radiation or reception of sound do to its acoustical properties. In such a variant, the conformal acoustic baffle has a cylindrical conformal opening to permit the radiation or reception of sound without restriction. In a preferred embodiment the tube-like baffle structure has an inner diameter that permits the placement around a cylindrical acoustic transducer such but not limited to those explained in this specification. Still further the acoustic baffle with tube-like structure may be removable and placed in use when directionality is needed.

The invention claimed is:

1. A method of producing an acoustical signal having a spiral wavefront with an omnidirectional magnitude and a phase that spirals outward varying linearly with angular position in a plane, comprising the steps of: creating two spatially orthogonal acoustic dipoles from at least one electroacoustic transducer and exciting said acoustic dipoles in quadrature with a nominal relative temporal phase difference of $\pi/2$ radians.

2. The method in claim 1, further including the means for generating an omnidirectional reference signal in both magnitude and phase in said plane, wherein said omnidirectional reference signal and spiral wavefront signal are coaxially aligned along a common axis, wherein the measurement of the relative phase between said omnidirectional reference signal and said spiral wavefront signal at some point in space a distance from said electroacoustic transducer provides a result proportional to the bearing angle in said plane from said electroacoustic transducer to said point in space.

3. The method of claim wherein the distance between said transducer producing said spiral wavefront and a second receiving element is determined by time-of-flight from the transmitted signal to said receiving element and a returned signal from said receiving element having transmit capability.

4. The method of claim 1, where said at least one electroacoustic transducer is used in receive mode to determine the angle of incidence of an acoustical signal by processing the received signals from each orthogonal dipole, said signals being proportional to sine and cosine of the incident angle of an impinging acoustic signal.

5. An underwater acoustic beacon, comprising: at least one electroacoustic transducer for generating a acoustic signal having a spiral acoustic wavefront, said acoustic wavefront having a phase that varies linearly with angular position in one plane and a magnitude that is nominally independent of angular position at a radial distance from said transducer, said at least one electroacoustic transducer comprised of two spatially orthogonal acoustic dipoles producing characteristic figure-eight radiation response with angle, said acoustic beacon further comprising two signal sources supplying electrical signals that are temporally phase biased by quadrature to each orthogonal acoustic dipole, one signal leading the other by $\pi/2$ radians, each of said electrical signals connected to one of said acoustic dipoles, wherein their linear combination produces said spiral acoustic wavefront.

6. An underwater acoustic beacon as in claim 5 wherein at least one electroacoustic transducer generates an acoustic signal having an omnidirectional acoustic wavefront in magnitude and phase that is nominally independent of angular position at a radial distance from said transducer, wherein said at least one piezoelectric acoustic transducer(s) are coaxially aligned.

7. An underwater acoustic beacon as in claim 5, wherein said at least one electroacoustic transducer is comprised of at least one cylindrical electroacoustic transducer element for generating at least one acoustic dipole.

8. An underwater acoustic beacon as in claim 5, wherein said at least one electroacoustic transducer is comprised of at least one hollow cylindrical piezoelectric element for generating both orthogonal acoustic dipoles.

9. An underwater acoustic beacon as in claim 5, wherein said at least one electroacoustic transducer is comprised of at least one hollow cylindrical piezoelectric element for generating an omnidirectional in magnitude and phase coaxially aligned reference signal.

10. An underwater acoustic beacon as in claim 5, wherein the at least one electroacoustic transducer is a hollow cylindrical piezoelectric element for generating at least one of said orthogonal acoustic dipoles, wherein said piezoelectric element is radially polarized, wherein the inner and/or outer electroded surfaces are divided permitting selective excitation of at least one acoustic dipole, wherein excitation of said piezoelectric element at its electromechanical resonance coinciding with a frequency of its first extensional mode of vibration produces a maximum response.

11. An underwater acoustic beacon as in claim 5, wherein the at least one electroacoustic transducer is a hollow cylindrical piezoelectric element for generating two orthogonal acoustic dipoles, wherein said piezoelectric element is radially polarized, wherein the inner and/or outer electroded surfaces are each divided in four quadrants permitting selective excitation of two orthogonal acoustic dipoles, wherein excitation of said piezoelectric element in the vicinity of the electromechanical resonance of the first mode of extensional vibration produces a maximum response.

12. An underwater acoustic beacon as in claim 5, wherein the at least one electroacoustic transducer is a hollow cylindrical piezoelectric element for generating two orthogonal acoustic dipoles, wherein said piezoelectric element is radially or tangentially polarized, wherein the inner and/or outer electroded surfaces are each divided in four quadrants permitting selective excitation of two acoustic dipoles, wherein excitation of said piezoelectric element at the electromechanical resonance coincides with the first extensional mode of vibration and produces a maximum response, wherein the beacon further comprises at least one additional hollow cylindrical piezoelectric element for generating an omnidirectional reference signal in both magnitude and phase, wherein said at least one additional hollow cylindrical piezoelectric element is smaller in diameter and/or composed of different piezoelectric materials thereby causing its electromechanical resonance frequency coinciding with the lowest zero-order extensional mode of vibration to be nominally the same in frequency as the resonance frequency of said hollow cylindrical piezoelectric element for generating two orthogonal acoustic dipoles vibrating at the first-order extensional resonance.

13. An electroacoustic transducer comprised of at least two coaxially aligned hollow cylindrical piezoelectric elements, at least two said piezoelectric element is radially polarized, wherein the inner and/or outer electroded surfaces are each divided permitting selective excitation of at least one orthogonal acoustic dipole, wherein excitation of said piezoelectric element at the electromechanical resonance coincides with the first extensional mode of vibration and produces a maximum response, wherein said transducer further comprises at least one additional hollow cylindrical piezoelectric element for generating an omnidirectional reference signal, wherein said at least one additional hollow cylindrical piezoelectric element is smaller in diameter and/or composed of different piezoelectric materials so its electromechanical resonance frequency coinciding with the lowest zero-order extensional mode of vibration is nominally the same in frequency as the resonance frequency of said acoustic dipoles.

14. An underwater acoustic beacon as in claim 5, wherein the at least one electroacoustic transducer is a hollow cylindrical piezoelectric element for generating two orthogonal acoustic dipoles, wherein said piezoelectric element is stripe-electroded and tangentially polarized, wherein the inner and/or outer electrodes stripes are each grouped in four quadrants permitting selective excitation of two acoustic dipoles, wherein excitation of said piezoelectric element at the electromechanical resonance coincides with the first extensional mode of vibration and produces a maximum response.

15. The beacon of claim 5, wherein at least one electroacoustic transducer generates at least one orthogonal acoustic dipole, wherein said piezoelectric element is circumferentially polarized with piezoelectric bar wedge elements, said bar wedge elements having electrode surfaces which may be divided and grouped permitting the selective excitation of at least one acoustic dipole.

16. The beacon of claim 5, wherein the at least one electroacoustic transducer is a hollow spherical piezoelectric element for generating the two orthogonal acoustic dipoles wherein the inner and/or outer electrodes are divided and excited in anti-phase to excite said dipoles.

17. An underwater hollow spherical electroacoustic transducer comprising: an open spherical piezoelectric element having one hole at one pole and a second hole at the opposite pole, said holes being nominally coaxially aligned and having diameters at least 5 percent of the outer diameter of said spherical shell, wherein the distal ends of said spherical piezoelectric element defined by said holes are nominally free to vibrate, therein said hollow spherical piezoelectric element having an electromechanical resonance frequency that is lower than a complete spherical shell of the same diameter without said holes.

18. The underwater electroacoustic transducer in claim 17, wherein said hollow open spherical piezoelectric element is radially polarized with inner and outer electrodes, wherein inner and/or outer electrodes are divided in at least two parts to permit the electromechanical excitation of at least one acoustic dipole.

19. The underwater acoustic beacon of claim 5, comprising: at least one spherical piezoelectric element for generating at least two spatially orthogonal acoustic dipoles.

20. An underwater electroacoustic transducer comprising: at least one hollow cylindrical piezoelectric element with inner and/or outer electrode surfaces divided in six parts, at least one opposing inner and/or outer pair of electrodes having electrical connections of opposite polarity, thereby producing three separate acoustical dipoles for the generation and/or reception of acoustical signals, said dipoles having trigonal symmetry in one plane.

21. An underwater acoustic beacon, comprising: at least one electroacoustic transducer for generating a acoustic signal having a spiral acoustic wavefront, said acoustic wavefront having a phase that varies linearly with angular position in one plane and a magnitude that is nominally independent of angular position at a radial distance from said transducer, said at least one electroacoustic transducer generating three spatially symmetric acoustic dipoles producing three characteristic figure-eight radiation response with angle each separated by 120 degrees, said acoustic beacon further comprising three signal sources supplying electrical signals that are temporally phase biased to each acoustic dipole, one signal leading the other by $\pi/3$ radians, each of said electrical signals are connected to one of said acoustic dipoles, wherein their linear combination produces said spiral acoustic wavefront.

22. The electroacoustic transducer in claim 20, wherein at least one of the electrode surfaces divided in six parts each spanning nominally a 60 degree sector is electrically excited to create a unidirectional acoustic radiation or reception of sound having a maximum response in one azimuthal direction in said plane.

23. An underwater electroacoustic transducer comprising: at least one hollow cylindrical piezoelectric element with inner and/or outer electrode surfaces divided in at least four parts, thereby defining N sectors, each sector having electrical connections of opposite polarity for the transmission or reception of sound, further comprising a means such as a switch for the selective excitation or reception of any one or more combinations of adjacent or opposing N sectors.

24. The underwater electroacoustic transducer in claim 23, wherein at least one hollow cylindrical piezoelectric element with inner and/or outer electrode surfaces divided in at least four parts, thereby defining N sectors, each sector having electrical connections of opposite polarity for the transmission or reception of sound, further comprising a means to switch the selective excitation or reception of any one or more combinations of adjacent or opposing N sectors.

25. A method of determining the angle of incidence of an acoustical signal comprising the steps of: at least one hollow cylindrical piezoelectric element with inner and/or outer electrode surfaces divided in at least six parts thereby defining 6 sectors, each sector having electrical connections, wherein at least three pairs of said electrodes are connected in anti-phase to obtain three acoustic dipoles in one plane, said dipoles spaced evenly and symmetrically 120 degrees apart, wherein the outputs of each dipole are measured and processed according to trigonometric relations to determine said angle of incidence of an acoustical signal.

26. A method of determining the angle of incidence of an acoustical signal comprising the steps of: at least one hollow cylindrical piezoelectric element with inner and/or outer electrode surfaces divided in at least six parts thereby defining 6 sectors, each sector having electrical connections, wherein at least three pairs of said electrodes are connected in anti-phase to obtain three acoustic dipoles in one plane, said dipoles spaced evenly and symmetrically 120 degrees apart, and the addition of an omnidirectional hydrophone having an omnidirectional receive pattern in one plane, said omnidirectional hydrophone being derived from the in-phase summation of signals from all six sectors of the hollow cylindrical piezoelectric element or from the addition of a second coaxially aligned cylindrical piezoelectric element, wherein the outputs of each dipole are measured and combined with the output of the omnidirectional hydrophone to produce three outputs having directional response proportional to a cardioid defined by the relation $1+\cos(\theta+n2\pi/3)$, where n=0, 1, 2 and $\theta$ defines the angular orientation of one dipole, from which the angle of incidence of the acoustical signal may be determined.

27. A method for determining the angle of incidence of an acoustical signal in a plane perpendicular to the axis of symmetry of a cylindrical transducer comprising the steps; at least one hollow cylindrical piezoelectric element with inner and/or outer electrode surfaces divided in at least three parts, thereby defining N sectors, each sector having electrical connections enabling the measurement of the phase difference signals between neighboring sectors due to excitation from sound impinging on said sectors.

28. A method of realizing a broad bandwidth, multi-resonant, hollow cylindrical piezoelectric transducer with omnidirectional radiation and reception in one plane, comprising the steps of: utilizing a hollow cylindrical piezoelectric cylinder polarized radially, circumferentially or tangentially, with a means for electrical connection of the inner and outer electrodes for excitation of vibration in the vicinity of the lowest order zero-mode extensional resonance, said resonance known to occur at a nominal frequency equal to the ratio of the sound speed of the piezoelectric material and the mean circumference of the cylinder; and a means for selective excitation of two spatially orthogonal acoustic dipoles in time quadrature with a nominal relative temporal phase difference of $\pi/2$ radians to generate a spiral wavefront with omnidirectional magnitude by connecting at least two pairs of opposing electrodes in anti-phase, said dipoles having an extensional mode resonance at a nominal frequency that is a factor of 1.4 higher than the zero-mode extensional resonance; and/or in addition with a means for excitation of said piezoelectric cylinder at a nominal frequency in the vicinity of the axial resonance of said piezoelectric cylinder, said axial resonance occurring at a nominal frequency equal to the ratio of the speed of sound of the piezoelectric material to the twice the height of the cylinder.

29. A segmented cylindrical electroacoustic transducer, comprising: piezoelectric single-crystal active prism segments with rectangular cross section, said active prism segments having electrodes on two opposing surfaces for electrical excitation or reception, further comprising passive prism segments with trapezoidal cross-sections or wedges glued between each of said active prism segments.

30. A segmented cylindrical electroacoustic transducer, comprising: piezoelectric single-crystal prism segments, said prism segments having electrodes on two opposing surfaces, said electrodes defining the inner and outer surfaces of a hollow cylinder or ring, said prism segments glued together to realize a hollow cylinder or ring, said single-crystal prism segments having diagonal crystal orientation and polarization defined by the Miller Index [110] or its equivalent designation in the direction perpendicular to the said electrodes, thereby permitting the electrical excitation of the transverse piezoelectric effect to cause extensional vibrations in said hollow cylinder or ring, and by reciprocity thereby permitting the mechanical excitation of the transverse piezoelectric effect to produce electrical signals.

31. The transducer of claim 29, further comprising passive prism segments with trapezoidal cross-sections or wedges glued between each of said piezoelectric single-crystal prism segments, wherein said single-crystal prism segments have trapezoidal, rectangular, wedge or curved-wedge cross-sections.

32. A hollow spherical transducer comprised of a mosaic of single-crystal piezoelectric planar elements of triangular and/or trapezoidal shape having nominally constant thickness, having electrodes on inner and outer surfaces, said prism segments glued together to realize said hollow spherical transducer, said single-crystal elements having diagonal crystal orientation and polarization defined by the Miller Index [110] or its equivalent designation through its thickness in the direction perpendicular to the said electrodes, thereby permitting the electrical excitation of the transverse planar piezoelectric effect to cause extensional vibrations in said hollow spherical transducer, and by reciprocity thereby permitting the mechanical excitation of the transverse planar piezoelectric effect to produce electrical signals.

33. A cylindrical conformal tube-like structure comprised of a compliant acoustic baffle, said baffle causing a reduction of the radiation or reception of sound when in contact or in the vicinity of a cylindrical acoustic transducer, further comprising a partial cylindrical conformal opening to permit without restriction the radiation or reception of sound, wherein said tube-like structure has an inner diameter that permits the placement around a cylindrical acoustic transducer, the inner diameter of said tube-like structure being nominally the same diameter as the cylindrical acoustic transducer.

* * * * *